Nov. 24, 1959   D. J. BLOOMBERG   2,914,296
OVERSPEED CONTROL FOR FUEL SYSTEM TURBOPUMP
Filed June 18, 1953   2 Sheets-Sheet 1
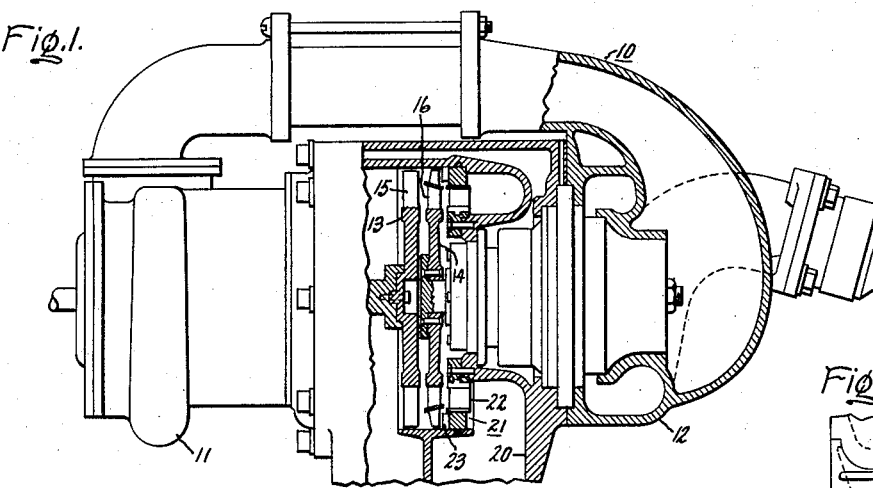
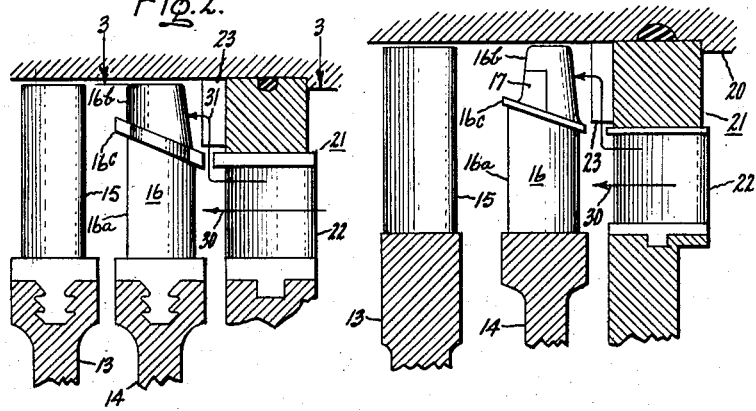
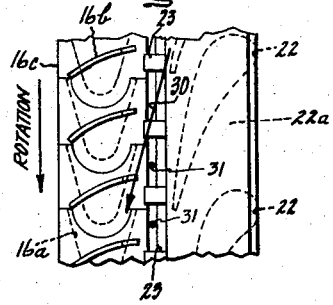
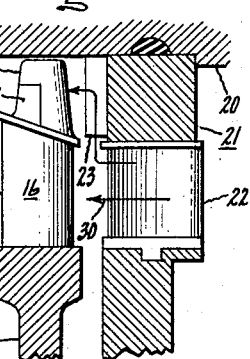
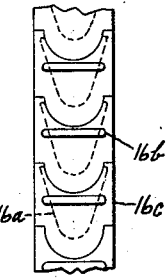
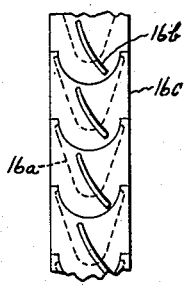
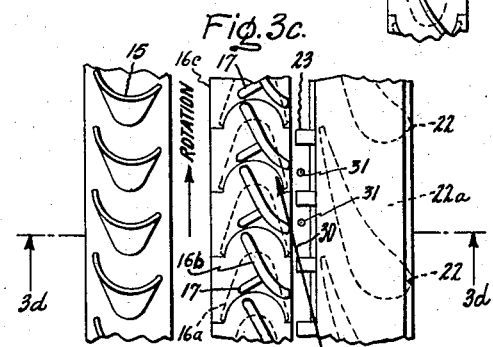
Inventor:
David J. Bloomberg,
by Edward M. Tritle
His Agent Nov. 24, 1959 D. J. BLOOMBERG 2,914,296
OVERSPEED CONTROL FOR FUEL SYSTEM TURBOPUMP
Filed June 18, 1953 2 Sheets-Sheet 2

*Inventor:*
*David J. Bloomberg,*
by *Edward M. Tritle*
*His Agent.*

United States Patent Office 2,914,296
Patented Nov. 24, 1959

2,914,296

OVERSPEED CONTROL FOR FUEL SYSTEM TURBOPUMP

David J. Bloomberg, Newton, Mass., assignor to General Electric Company, a corporation of New York Application June 18, 1953, Serial No. 362,617

3 Claims. (Cl. 253—16.5)

This invention relates to turbomachine blading and specifically to overspeed control means for a rotor used with a turbopump in a fuel system.

In axial flow turbine construction, it is the practice to design rotor buckets and space them on the rotor periphery for shockless entry and smooth flow of motive fluid into and through the fluid passages between them, in order to extract maximum power from the fluid. This requires that the motive fluid enter the passages between the rotor buckets in a flow substantially parallel to the sides of the buckets defining the entrance area. Whenever the turbine rotor greatly exceeds its normal operating speed, as upon sudden removal of its load, the danger of bursting of the rotor and resulting damage therefrom arises; and since, under overspeed conditions, the entrance angle of the motive fluid changes from normal, e.g. other than parallel to the bucket sides at the entrance area, there is interference with and modification of the fluid flow through the bucket defined passages, with increased shock against the back of the buckets.

It is customary also to design the shape of rotor buckets and entrance angles to the passages between them to attain a rotor efficiency at rated operating speed which is slightly below the maximum, to allow for slight rotor overspeed before efficiency starts to drop off.

Another turbine design consideration is the unavoidable motive fluid leakage past the clearance at the rotor bucket ends which, in the case of counterrotating turbine rotors, results in inefficient motive fluid flow between stages.

Accordingly, it is an object of invention to provide a novel structure by which the speed of a fluid driven turbine rotor may be controlled.

It is another object of invention to provide a control structure for retarding an overspeeding rotor.

A further object of invention is to provide an improved turbine construction for reducing deleterious motive fluid leakage and for using the same for rotor speed control.

These and other objects of invention will become more apparent by reference to the following description taken in conjunction with the accompanying drawings, which illustrate my invention and in which Fig. 1 is a partial longitudinal section through a turbopump combination utilizing my novel blading structure;

Fig. 2 is an enlarged diagrammatic cross section of the blading structure illustrated in Fig. 1;

Fig. 3 is a partial development of an end view of the blading structure disclosed in Fig. 2, looking in the direction of line 3—3;

Figs. 3a and 3b are other partial developments of end views of modifications of the blading structure disclosed in Fig. 3;

Fig. 3c is another partial development of an end view of a modification of the blading structure disclosed in Fig. 3;

Fig. 3d is a cross section of the modification disclosed in Fig. 3c taken along line 3d—3d;

Figure 4:
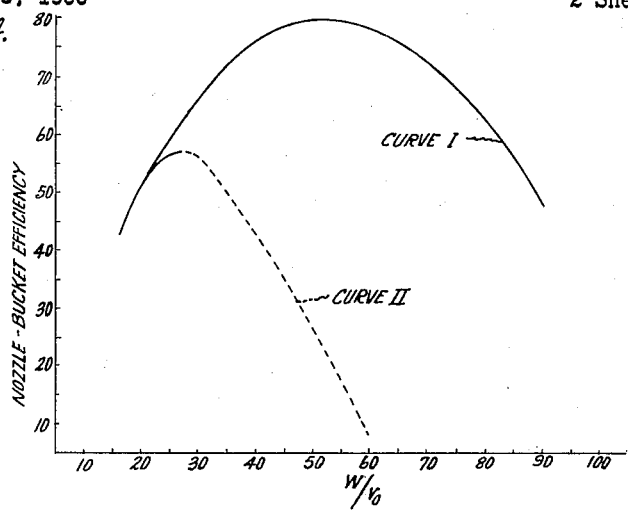
Fig. 4 is a graphical representation of the nozzle and bucket efficiency plotted against the relation of peripheral rotor speed to velocity of the motive fluid based on the stage energy.

In accordance with the illustrated embodiments of my invention, I employ tiered blading elements with the outer portions serving as brake vanes for overspeed control of a high pressure turbine rotor in a turbopump structure, and buckets designed for maximum efficiency with respect to the ratio of the peripheral wheel speed to the velocity of the motive fluid based on the stage energy entering the low pressure turbine rotor for speed control thereof.

In the drawing, part of an air turbine driven fuel pump combination is disclosed generally at 10, comprising a turbine driven low pressure pump 11, supplying a coaxially mounted but mechanically independent turbine driven high pressure pump 12, both shown diagrammatically, and driven by mechanically independent turbine rotors 13 and 14, respectively, arranged in series flow relationship with each other. Buckets or blading 15 and 16 are carried respectively by turbine rotors 13 and 14, blading 16 comprising inner and outer tier buckets 16a and 16b, respectively, separated by shroud 16c, the tiered buckets as disclosed in Fig. 3 having oppositely directed profiles. There is no critical direction for the outer tier buckets, which may take the configuration disclosed in Figs. 3a and 3b, the numbering being the same for like members, Fig. 3a showing the outer tier buckets as axially extending straight radial blading and Fig. 3b as having the outer tier profiles directed the same as in the inner tier.

The inlet manifold for the motive fluid, for example, air from a source such as the compressor discharge of the aircraft gas turbine, is shown at 20, with an inlet diaphragm structure at 21, comprising the inlet nozzle vanes 22 defining inlet passageways 22a and axially extending radial vanes or "spoilers" 23, situated above the passageways and extending toward the upper tier buckets 16b of blading 16. The inner edges of the "spoilers" 23 are shown as overlapping shroud 16c but this structural feature is not as vital for the successful operation of my invention as is a relatively wide axial clearance between the inlet diaphragm structure 21 and the tiered blading 16 on turbine rotor 14, across which the radial vanes extend.

It is well known in turbine bucket design that the angular configuration of the rotor buckets can be determined so that the turbine rotor will operate safely and efficiently at a predetermined maximum speed because of the inherent design of the fluid flow passages.

Curve I of Fig. 4 is a typical graph of the nozzle and bucket efficiency plotted against $w/v_0$, the ratio of peripheral wheel speed to velocity of the motive fluid based on the stage energy, and can be calculated from any turbine nozzle and bucket flow design, whence it can be shown that such efficiency is characteristic of the velocity diagram and the flow volume of the motive fluid. By utilizing analytical and empirical knowledge of the effect on such efficiency of variation of the flow path area calculated from the velocity diagram and flow volume and the actual physical flow area, an efficiency curve similar to that of curve II of Fig. 4 can be obtained, for use in bucket design. Because turbopumps are auxiliary units in aircraft where weight of the unit must be balanced against its efficiency, they are designed for the range used without regard for a high efficiency.

The principle of my rotor overspeed control is to decrease the flow path efficiency abnormally as rapidly as possible at overspeed conditions so that the decreasing bucket output with increasing speed will finally balance the bearing, windage and other power losses of the turbine wheel, which should be designed for the stresses encountered at the maximum speed where the power balance is reached. I have found that in addition to my novel blading and radial vanes on the diaphragm face adjacent thereto, a minimum bucket entrance area, with respect to the velocity diagram and flow volume for a given operating speed and pressure ratio, coupled with a minimum bucket entrance angle with positive guidance therefor are requisite. At a given pressure ratio, the four elements cited above coact to effect zero net rotor output at some limiting speed, but at low pressure ratios, the latter two design features predominate in reducing net rotor output to zero and are such as to effect rapid deterioration of nozzle and bucket efficiencies beyond the design limit. At these lower pressure ratios, the lower energy combined with the fixed maximum speed value, will give a relatively high $w/v_0$ condition so that the deterioration of the bucket flow path efficiency would predominate in producing a balance between the wheel output and the fixed losses and therefore yield a limiting speed, in which case the outer tier blading elements play a minor part.

At higher pressure ratios, a portion of the motive fluid will flow into the outer tier, due to the deficiency between the actual effective bucket entrance flow area and the required fluid flow area. The radial fins are designed to deteriorate the angular velocity of the by-pass flow entering the outer tier blading. The power required to accelerate the by-pass flow from the low entering velocity to that of the tiered blading will decrease the net wheel output. At these higher pressure ratios, the higher energies result in a lower operating $w/v_0$ and the $w/v_0$ deterioration effect is not sufficient to limit the maximum speed to the required value and the outer tier blading plays a major role in limiting the speed.

Referring specifically to Figs. 2 and 3 of the drawings, under normal conditions the incoming motive fluid is guided in the direction of arrows 30 by the inlet nozzle vanes 22 through the passageways 22a into the fluid passages between buckets 16a, at the desired angle. At relatively high pressure ratios and with the wide axial clearance between the inlet diaphragm 21 and blading 16 on turbine rotor 14, some of the motive fluid will deviate upwardly between the radial vanes or "spoilers" 23, as indicated by arrows 31 in Fig. 2 and as dotted circles in Fig. 3. When this portion of the motive fluid enters the space between the "spoilers," its angular component imparted by inlet nozzle vanes 22 is dissipated or "spoiled" and will tend to enter the fluid passages between the outer tier blading 16b substantially at right angles to the direction of rotation of the turbine rotor. The acceleration of this by-pass "spoiled" fluid produces a braking action on the wheel and works against overspeeding of the turbine rotor 14. In fact, when overspeeding becomes serious, the entering motive fluid at 30 will strike the back of the buckets 16a and choke the entrances to the passages between them, causing an abnormal amount of the entering motive fluid to be forced upwardly between the "spoilers" 23 and against the upper tier blading 16b to intensify the braking action, so that the greater the tendency of the motive fluid to choke up at the passage entrances due to overspeed conditions, the greater is the tendency to alleviate this situation by the braking action of the by-passed motive fluid from the "spoilers" acting against blading 16b, as well as the additional braking action due to the motive fluid striking the back of buckets 16a, thus obtaining effective overspeed control of the high pressure turbine rotor. The motive fluid which traverses the fluid passages defined by the tier blading 16a and 16b meets on the downstream side of turbine rotor 14 and blading 16 and acts against blading 15 carried by turbine rotor 13.

The overspeed control for the low pressure turbine follows from the shape of the buckets 15 carried by the rotor 13, their inherent design being such that as the ratio of the peripheral wheel speed to velocity of the entering motive fluid based on the stage energy increases, the efficiency of the turbine rotor decreases, resulting even at slight overspeed conditions, since the turbine rotor is designed for a normal operating speed appriximately at the peak of the efficiency curve.

As described previously, at low pressure ratios under overspeed conditions, the angle of entry of the motive fluid into the entrance area changes so that the fluid strikes the backs of the turbine buckets to effectuate a braking effect. Here, again, the greater the overspeed, the greater is the braking effect of the motive fluid and tendency of the turbine rotor to return to designed operating or lower speeds. Thus, the speeds of both the high and low pressure turbine rotors are governed.

Figure 5:
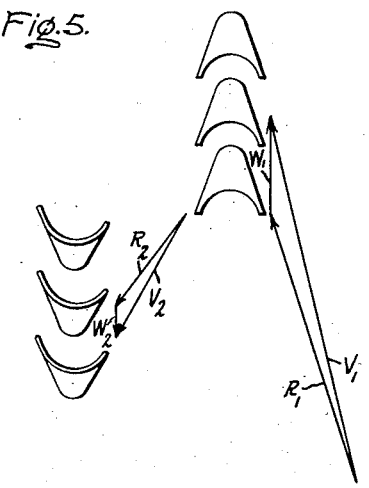
Fig. 5 is a schematic velocity diagram of motive fluid flow under normal conditions through the fluid passages between the buckets on counterrotating turbine rotors.
Figure 6:
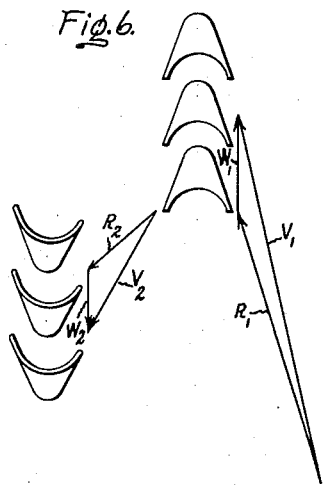
Fig. 6 is a diagram similar to that of Fig. 5 depicting motive fluid flow when overspeeding of the low pressure turbine rotor occurs.
Figure 7:
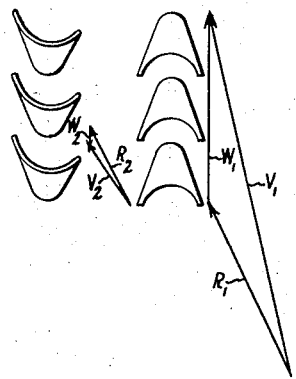
Fig. 7 is another velocity diagram showing schematically motive fluid flow through the passages between counterrotating turbine buckets when both rotors are in overspeed condition.

The velocity diagrams in Figs. 5, 6 and 7 illustrate schematically the flow of motive fluid against the turbine blading and through the fluid passages defined by them. In these three figures, $V_1$ and $V_2$ represent the absolute velocities of the entering motive fluids, $R_1$ and $R_2$ represent the relative velocities of the entering motive fluid and $W_1$ and $W_2$ represent the counterrotating rotor periphery velocities.

Fig. 5 shows the normal or standard operating condition with the fluid striking the forward faces of the buckets to attain maximum energy conversion. In Fig. 6, the low pressure turbine rotor is in overspeed condition as shown by the relative velocity vector $R_2$ striking the back of the bucket; and in Fig. 7, both low and high pressure turbine rotors are in overspeed condition as shown by the relative velocity vectors $R_1$ and $R_2$ striking the bucket backs.

Figs. 3c and 3d disclose a modification of the upper tier buckets 16b, the turbine rotors and buckets being numbered as in Figs. 2 and 3. Each modified outer tier bucket 16b carries a protuberance 17 projecting substantially at right angles from the back side of the bucket toward the downstream edge of the adjacent blade to form an effective gate across a portion of the exit area. This protuberance is approximately half the height of the upper tier bucket 16b at its downstream edge as seen in Fig. 3d, to allow motive fluid to pass through the fluid passages defined by buckets 16b, against buckets 15 and reasonably reduce any trend for turbine rotor 14 to pump fluid counter the flow of motive fluid.

It will be apparent to those skilled in the art that applicant's novel blading structure controls the speed of his turbopump device without any external governor structure, that by proper design of the turbine blading, overspeeding is limited definitely and that there is no necessity that the invention be limited to counterrotating turbine rotors, for the principles of my invention are applicable even when the turbine stages are separated by stationary vanes.

Although many changes can be made in the disclosed structure without departing from the scope of the claims, it is intended that all matter contained in the preceding description or shown in the accompanying drawing shall be interpreted as illustrative and not limitative.

What I claim as new and desire to secure by Letters Patent of the United States is:

1. In a turbomachine, a turbine rotor having tiered blading, said blading having a shroud dividing inner and outer tiers of buckets, a diaphragm structure including a plurality of nozzle vanes spaced axially from said inner bucket tier, means forming an axial clearance space adjacent the upstream side of said outer tier of buckets, passage means interconnecting the clearance space between said inner bucket tier and said nozzle vanes and the clearance space adjacent said outer bucket tier whereby excess fluid flow to said inner bucket tier is deflected radially outwardly through said passage means to the clearance space adjacent said outer bucket tier, and a plurality of radially disposed guide vanes extending axially into the clearance space adjacent said outlet bucket tier and beyond the downstream edges of said nozzle vanes to cause deterioration of the angular velocity component of fluid deflected outwardly from said inner bucket tier.

2. In a turbomachine, the combination of a rotor and a diaphragm structure having a relatively wide clearance therewith, said rotor including peripherally spaced blading having a shroud dividing inner and outer tiers of buckets, said diaphragm structure including inlet nozzle openings for providing operating motive fluid to said inner tier, means defining a clearance space adjacent the upstream side of said outer tier of buckets, passage means interconnecting the clearance space adjacent said outer tier and the axial clearance space between said inner tier and said diaphragm structure to provide for radially outward diversion of excess motive fluid from said inner tier, and radial vanes extending axially across the clearance space adjacent said outer tier beyond said nozzle openings in close proximity to said outer tier of buckets and with substantially the same radial dimensions, the upstream edges of said inner tier of buckets being set at a minimum bucket entrance angle for positive guidance of motive fluid into the fluid passages between adjacent buckets and defining a minimum bucket entrance area for predetermined operating conditions whereby at overspeed conditions said motive fluid strikes the backs of said inner tier buckets and is deflected outwardly between said radial vanes for velocity deterioration thereof and redirection against said outer tier of buckets.

3. In the combination as set forth in claim 2, a projection integral with the shroud and back side of each outer tier bucket and extending normally thereto toward the opposite bucket adjacent the exit area of the fluid passage therebetween whereby fluid flow through said passage is substantially obstructed, the height of said projection being substantially less than that of adjacent buckets.

References Cited in the file of this patent
UNITED STATES PATENTS

| | | |
|---|---|---|
| 712,424 | Tyzack | Oct. 28, 1902 |
| 1,544,318 | Hodgkinson | June 30, 1925 |
| 2,438,357 | Bloomberg | Mar. 23, 1948 |
| 2,584,555 | Cleave | Feb. 5, 1952 |
| 2,624,173 | Bloomberg | Jan. 6, 1953 |